(12) United States Patent
Hue et al.

(10) Patent No.: US 8,925,871 B2
(45) Date of Patent: Jan. 6, 2015

(54) WING OF AN AIRCRAFT

(75) Inventors: Xavier Hue, Bremen (DE); Bernhard Schlipf, Bremen (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/464,960

(22) Filed: May 5, 2012

(65) Prior Publication Data

US 2012/0312932 A1     Dec. 13, 2012

Related U.S. Application Data

(63) Continuation of application No. PCT/EP2010/006759, filed on Nov. 5, 2010.

(60) Provisional application No. 61/258,357, filed on Nov. 5, 2009.

(30) Foreign Application Priority Data

Nov. 5, 2009  (DE) .......................... 10 2009 051 983

(51) Int. Cl.
  *B64C 9/26*  (2006.01)
  *B64C 9/22*  (2006.01)

(52) U.S. Cl.
  CPC ....................................... *B64C 9/22* (2013.01)
  USPC ........................................................ 244/214

(58) Field of Classification Search
  CPC ................................... B64C 9/22; B64C 9/26
  USPC ........................... 244/213, 214, 215, 216, 217
  See application file for complete search history.

(56) References Cited

U.S. PATENT DOCUMENTS

| | | | | |
|---|---|---|---|---|
| 3,655,149 A | * | 4/1972 | Williams | 244/225 |
| 3,883,093 A | * | 5/1975 | Violleau | 244/215 |
| 4,213,587 A | * | 7/1980 | Roeseler et al. | 244/213 |
| 4,305,177 A | * | 12/1981 | Feifel | 244/215 |

(Continued)

FOREIGN PATENT DOCUMENTS

| | | |
|---|---|---|
| DE | 35 05 839 A1 | 8/1986 |
| EP | 1 619 117 A1 | 1/2006 |
| GB | 2 323 577 A | 9/1998 |

OTHER PUBLICATIONS

International Search Report for Application Serial No. WO 2011/054532 A3 dated Sep. 5, 2011.
German Office Action for Application No. 10 2009 051 983.1 dated Mar. 5, 2013.

*Primary Examiner* — Rob Swiatek
(74) *Attorney, Agent, or Firm* — Jenkins, Wilson, Taylor & Hunt, P.A.

(57) ABSTRACT

A wing of an aircraft provided with a main wing and an arrangement of leading edge lifting bodies, which as seen with reference to the incident flow direction are arranged on the leading edge, which are adjustably arranged on the main wing one behind another as seen in the spanwise direction of the main wing by means of respectively two positioning devices spaced apart from one another in the spanwise direction of the main wing. The wing has a connecting device, which is coupled to each of two adjacent leading edge lifting bodies, wherein the connecting device is configured such that in the event of a fracture of a positioning device of a positioning body external forces acting on the latter are transferred via the respective connecting device to the leading edge lifting bodies coupled up via the latter.

14 Claims, 4 Drawing Sheets

(56) References Cited

U.S. PATENT DOCUMENTS 4,335,671 A * 6/1982 Warner et al. ............... 114/274

4,494,716 A 1/1985 Breedveld et al.
4,715,567 A 12/1987 Poccard
6,467,733 B1 10/2002 Young et al.

* cited by examiner

WING OF AN AIRCRAFT

CROSS-REFERENCE TO RELATED APPLICATIONS

The present application is a continuation of International Application No. PCT/EP2010/006759, filed on Nov. 5, 2010, which claims priority from German Application DE 10 2009 051 983.1, filed on Nov. 5, 2009, and claims the benefit of U.S. Provisional application 61/258,357, filed on Nov. 5, 2009, each of which is hereby incorporated in its entirety by reference.

FIELD OF THE INVENTION

Embodiments of the invention provide a wing of an aircraft with a main wing and an arrangement of leading edge lifting bodies, which are adjustably arranged on the main wing one behind another as seen in the spanwise direction of the wing, in each case by means of two positioning devices spaced apart from one another in the spanwise direction of the wing.

BACKGROUND

In the prior art wings of this type are of known art, with leading edge lifting bodies that are adjustable relative to a main wing according to the flight phase, that is to say, e.g., takeoff, climb, cruise, descent and landing. In each of these flight conditions different flows prevail on the wings of the aircraft. In order to generate and maintain a shape that is as aerodynamic as possible, and/or the highest possible lifting forces, the profile of the aircraft wing must be matched to the flight condition in question.

So-called droop flaps, or also Krüger flaps, have been used for this purpose for a long time; these are arranged in the leading edge regions of the wing. These flaps can execute movements relative to the flow body so that an alteration of the profile ensues.

However, it is precisely this leading edge region of a wing that is exposed in flight operations to the risk of collision with foreign bodies such as stones, ice particles, or birds. In particular such collisions can loosen a leading edge lifting body at least partially from the main wing, such that safety critical damage to the leading edge lifting body, and thus also to the wing, occurs. In these circumstances, in particular, parts of the mountings connecting the flaps with the flow body can be damaged or even fracture. This leads to the flap being partially loosened from its predetermined position such that it no longer fulfils its function. Moreover the hazard also exists that a partially loosened flap damages or jams directly adjacent flaps, such that their fault-free function is also no longer guaranteed. In particularly heavy impacts it is conceivable that a flap affected detaches completely from the wing. All cases cited represent a significant safety risk, in which correct flow around the wing is no longer guaranteed and there is a risk of unstable flight conditions culminating in a crash.

SUMMARY

Various embodiments of the invention provide a wing of the type cited in the introduction, with which safety critical damage can be avoided in respect of the impact of parts in the flow direction.

In accordance with various embodiments of the invention a wing of an aircraft is provided with a main wing and an arrangement of leading edge lifting bodies, which as seen with reference to the flow direction or incident flow direction are arranged on the leading edge, which are adjustably arranged on the main wing one behind another as seen in the spanwise direction of the wing, in each case by means of two positioning devices spaced apart from one another in the spanwise direction of the wing. The wing has a connecting device, which is coupled to two respectively adjacent leading edge lifting bodies, wherein the connecting device is configured such that in the event of a fracture of one positioning device of a positioning body external forces acting on the latter are transferred via the respective connecting device to the leading edge lifting bodies coupled together via the latter. This offers the advantage of an increased level of security, because as a result of the additional structural link it can be guaranteed that the positioning body is essentially held in its predetermined position, even in the event that a mounting unit is damaged.

In accordance with one example embodiment of the invention provision is made that the connecting device is configured and coupled to two respectively adjacent leading edge lifting bodies such that between the connecting device and each of the leading edge lifting bodies, at least in their retracted state, a controlled freedom of relative movement exists. In particular the freedom of relative movement can be selected such that in normal operation the connecting device does not transfer any longitudinal loads.

The freedom of relative movement is in particular selected such that in the event of occurrence of damage to the leading edge lifting body and/or to one of the mounting devices holding the latter in position, or in the event of a positioning device that has exceeded the limits of the freedom of relative movement range, the leading edge lifting body on which the damage has occurred is held in position by the connecting device on the respectively other leading edge lifting body.

The connecting device can be configured as a rigid connecting bar, which is flexibly coupled to the leading edge lifting bodies that are coupled together by means of the connecting device. Here the coupling together of the connecting device to the leading edge lifting bodies can be provided in each case by means of a spherical mounting.

Furthermore provision can be made that the connecting device has a damping device for the purpose of damping shocks occurring in the connecting device. Alternatively or additionally a crash absorber device can be integrated into the connecting device. In the event of occurrence of damage to the leading edge lifting body, and/or to one of the mounting devices retaining the latter, or to a positioning device of the same, the crash absorber device ensures that a relatively large shock, to be accommodated in the first instance by the connecting device, is absorbed so that this shock is not transferred, or is transferred at a reduced level, to the respectively other leading edge lifting bodies. The damping device ensures that shocks occurring in the connecting device are damped, and transferred to the respectively other leading edge lifting bodies in a damped manner.

The connecting device can furthermore be configured in an elastic manner.

In accordance with a further example of embodiment the connecting device can be configured such that it couples the leading edge lifting bodies, at least in an extended position of the same, in a pre-loaded state. Here the connecting device can in particular be configured in an elastic manner.

In accordance with a further example of embodiment provision can be made that the connecting device is configured such that this is elastically executed or is formed from an elastic material in the longitudinal direction of the connecting device and transverse to the longitudinal direction of the connecting device such that the connecting device is elastically extensible in its longitudinal direction extending between the points at which it couples together the leading edge lifting bodies. Here the elasticity properties can be configured such that the elasticity reduces with increasing extension of the coupling device.

The connecting device can be mounted on the leading edge lifting bodies that are coupled by the connecting device such that it cannot rotate.

In general the leading edge lifting body can be a slat, or a leading edge flap, and in the latter case, in particular, a Krüger flap.

BRIEF DESCRIPTION OF THE DRAWINGS

In what follows examples of embodiment of the invention are described with the aid of the accompanying schematic figures, where.

DESCRIPTION

Various embodiments of the invention concern a wing with a high-lift system, which in particular has a leading edge lift system HAS1. In accordance with various embodiments of the invention the aircraft or its wings can have a leading edge lift system HAS1, and in addition a trailing edge lift system (not shown). The leading edge lift system HAS1 is in general provided for purposes of positioning at least one leading edge lifting body or one leading edge positioning body, which can be a slat or a leading edge flap. The trailing edge lift system is provided for purposes of positioning at least one trailing edge lifting body or one trailing edge positioning body, which can be a landing flap, or a leading edge flap, or a flap that can be rotated on the wing.

Figure 1:
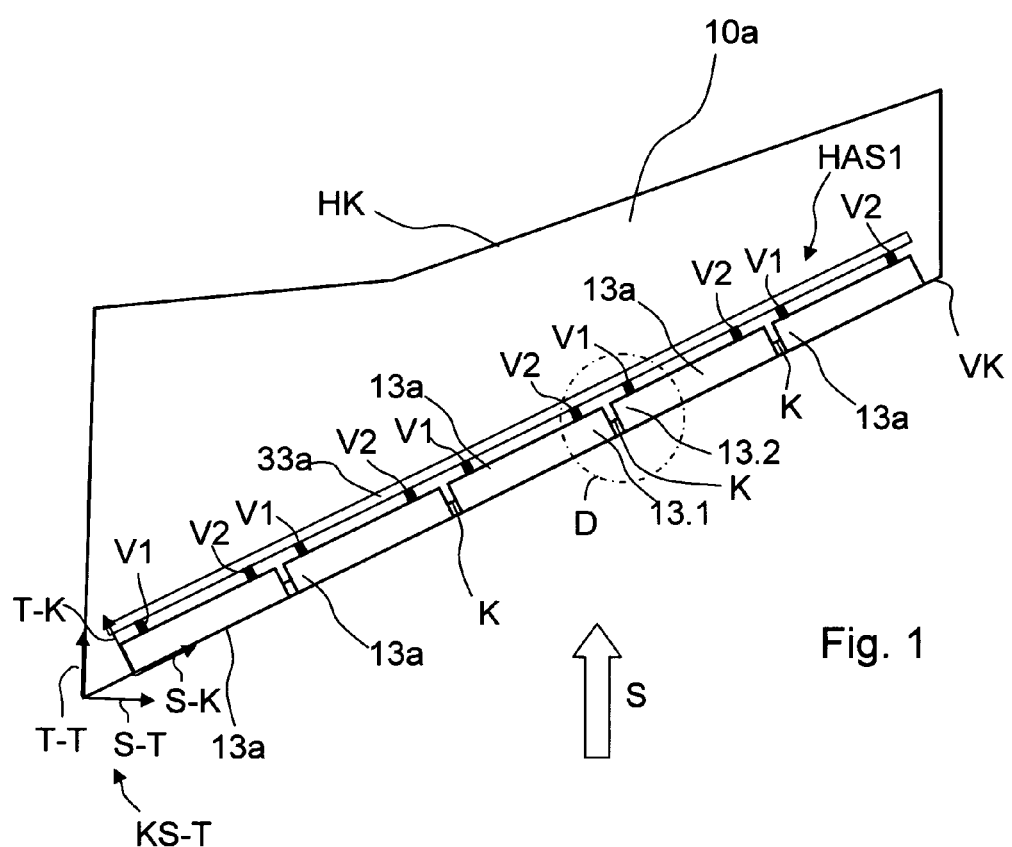
FIG. 1 shows a plan view onto a flow body in accordance with an embodiment of the invention.

For purposes of orientation the example of embodiment of a wing 10a shown in FIG. 1 is assigned a wing coordinate system KS-T, with an axis S-T for the spanwise direction, an axis T-T for the chordwise direction (FIG. 2), while the axis for the thickness direction of the wing is not represented. The aircraft to which the wing is fitted usually has a control input device arranged in the cockpit of the aircraft for the input of control commands to control the flight path of the aircraft, which in particular can have the pilot input means such as a steering column and optionally also pedals, a flight control device functionally connected with the control input device with a flight control computer to control the aircraft flight path, and also an input device arranged in the cockpit of the aircraft for inputting "required" commands to position the high-lift bodies 13a.

Furthermore the aircraft has a sensor device functionally connected with the flight control device with an air data sensor device to record flight condition data to determine the flight condition and also an inertial sensor device to record a flight condition of the aircraft and in particular the rates of turn of the aircraft. The air data sensor device has air data sensors to determine the flight condition of the aircraft and in particular the dynamic pressure, static pressure and temperature of the air flowing around the aircraft. In particular, rates of rotation of the aircraft are determined with the inertial sensor device, including the yaw rates and roll rates of the aircraft, to determine the flight orientation of the latter. The flight control device has a receptor device to receive the sensor values recorded by the sensor device, which are transmitted from the latter to the flight control device.

At least one actuator and/or one drive device is assigned to the control surfaces respectively present on the aircraft, such as e.g. the rudders or spoilers; in each case the actuator and/or drive device is activated by the flight control device by means of command signals, which are "required" commands, so as to position the respectively assigned control surfaces to control the aircraft. Here provision can be made that one actuator, or (to increase the reliability of the aircraft system) a plurality of actuators, is assigned to each of these control surfaces. The flight control device has a control function, which receives control commands from the control input device, and sensor values from the sensor device, and in particular the rates of rotation recorded by the latter. The control function is executed such that it generates positioning commands for the actuators as a function of the control commands and the recorded rates of rotation being received and transmits these to the latter, so that by means of operation of the actuators the control of the aircraft takes place in accordance with the control commands. Furthermore the slats 13a respectively present on the aircraft and, on occasion, the trailing edge flaps, are respectively coupled up to a positioning mechanism, which is respectively driven by a drive device.

FIG. 1 represents an example of embodiment of a high-lift system with a leading edge lift system HAS1 and a trailing edge lift system HAS2; in what follows it is the leading edge lift system HAS1 that is described.

The leading edge lift system HAS1 represented in FIG. 1 has five leading edge lifting bodies 13a on the wing 10a, which are adjustably arranged relative to the latter. In an exemplary manner a spanwise direction S-K and a chordwise direction T-K of the leading edge lifting body 13a are registered in FIG. 1 on one of the leading edge lifting bodies 13a there represented.

The leading edge lift system HAS1 has a leading edge lift system activation device, which contains an activation function, which, on the basis of inputs and, in particular, "required" commands, generates positioning commands to position the leading edge lifting bodies, and transmits these to the leading edge lift system drive device to operate the positioning mechanism HAS1-V.

In the high-lift system in accordance with various embodiments of the invention less or more than three leading edge lifting bodies can in general also be present on each wing. The leading edge lift system can in particular have:

Leading edge lifting bodies 13a, which in each case are arranged on wings such that they are adjustable relative to the latter.

A positioning mechanism mechanically coupled with the trailing edge lifting bodies for the positioning of the same;

A leading edge lift system drive device coupled with the positioning mechanism to operate the positioning mechanism on the basis of positioning commands received;

A leading edge lift system activation device, which contains a activation function, which, on the basis of inputs and, in particular, of "required" commands, generates positioning commands to position the leading edge lifting bodies 13a, and transmits these to the leading edge lift system drive device to operate the positioning mechanism.

In the high-lift system in accordance with various embodiments of the invention only one or more than two landing flaps can in general also be present on each wing.

In each case the drive devices can be coupled together via a total of two rotary drive shafts to operate the at least one flap of the leading edge lift system per wing. On the basis of appropriate control commands the activation device rotates the rotary drive shafts to exert actuating movements of the positioning devices, coupled with the latter, of the flap in question.

The lifting bodies are mounted by means of mounting devices on the main wing; these are configured such that the lifting bodies can be moved within the range of positions in accordance with specifications. In accordance with one example of embodiment of a high-lift system at least two positioning devices V1, V2 are provided on each lifting body 13a to position the lifting bodies. Transmission gearing and positioning kinematics, and optionally also a position sensor, can be assigned to each of the positioning devices V1, V2. The transmission gearing is mechanically coupled to the respective rotary drive shaft and converts a rotational movement of the respective rotary drive shafts into a positioning movement of the region of the flap that is coupled with the respective positioning device. With a position sensor the current position of the respective flap can be determined and transmitted via cabling, not represented, to the activation device. In addition an asymmetry sensor can be arranged at the ends of the rotary drive shaft trains; this is functionally connected with the activation device and via this cabling transmits a current value to the control and monitoring device, which states whether the ends of the rotary shaft drive trains are rotated within a prescribed range, or whether asymmetric rotational positions of the rotary drive shafts are present. Furthermore a wing end region brake can be arranged in each case at a point on the rotary drive shafts that is situated in an outer region of the wing in question; when operated this can lock the respective drive train. Each of the wing end region brakes is functionally connected via cabling, likewise not represented, with the actuation device, and via this cabling can be activated and operated by the actuation device. In operation the normal initial state of the wing end region brakes is a non-operated state in which they do not interfere with the rotation of the rotary drive shafts. The wing end region brakes can be actuated with an appropriate control signal from the activation device so as to arrest the respectively assigned rotary drive shafts.

Furthermore one or a plurality of braking devices can be provided that are functionally connected with the activation device, which under predetermined conditions operates the braking devices and thus can arrest the rotary shaft drive trains.

Mechanical faults in the lifting body operating mechanisms, such as e.g. jamming of a component of a flap operation mechanism or the rotary drive shaft trains, or fracture of a rotary drive shaft of a rotary drive shaft train can lead to undesirable behaviour of the device, such as e.g. asymmetric operation of the flap elements, which the activation device detects by means of the signals transmitted by the asymmetry sensors. Thereupon the actuation device transmits a switch-off signal to the braking device and/or to the wing end region brake, so as to operate the wing end region brakes and arrest the rotary drive shafts. In the event of a non-permissible deviation from the "required" positions, determined by the activation device from the "actual" positions recorded by the position sensors, the activation device transmits an operating signal to the wing end region brakes, and also to the braking devices, to arrest both shaft trains.

As can be seen from the representation in FIG. 1, the wing 10a has a main wing 10 and an arrangement of at least two leading edge lifting bodies or leading edge positioning bodies 13a. With reference to a flow circulating around the wing 10a in accordance with specifications with an incident flow direction S the flow body 10 has a leading edge VK and a trailing edge HK. With reference to the incident flow direction S the leading edge VK is situated in the upstream direction and the trailing edge HK in the downstream direction. The leading edge lifting bodies are arranged on the leading edge VK, which in FIG. 1 are represented in a withdrawn or retracted position, in which the leading edge lifting bodies 13a lie close to the main wing 10.

Figure 4:
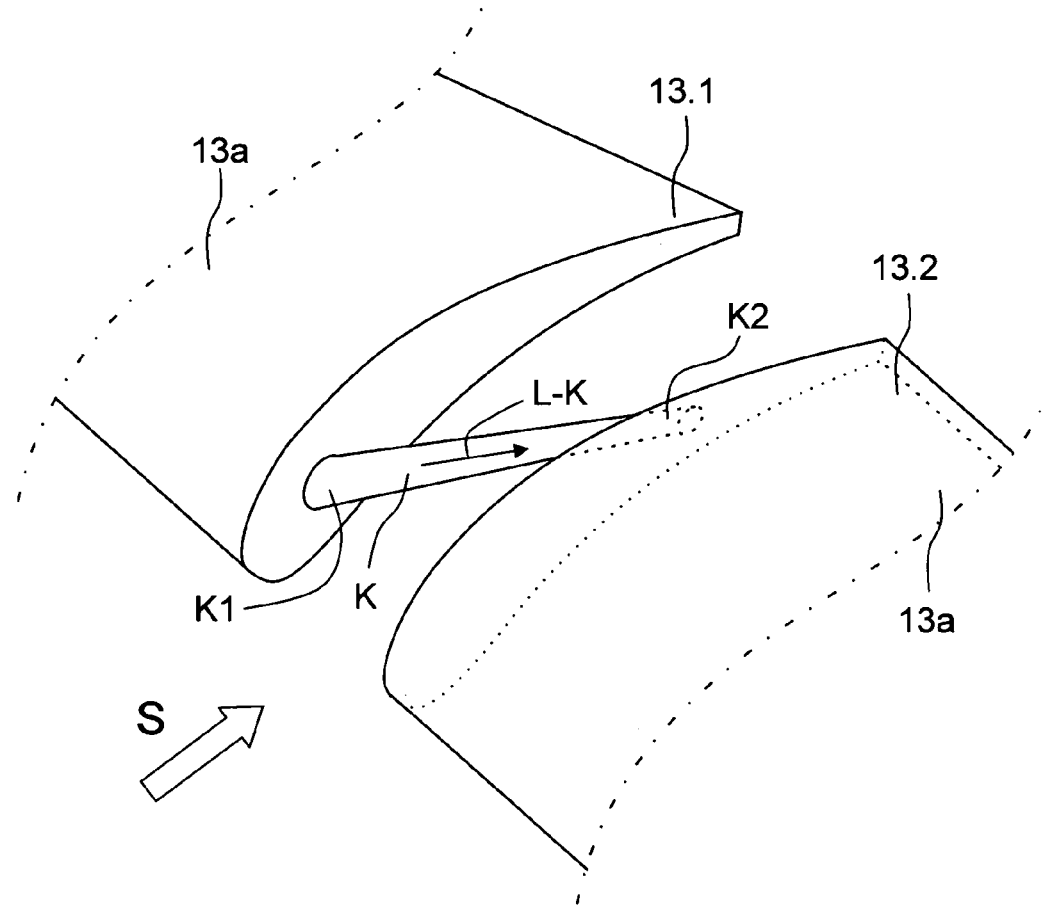
FIG. 4 shows a perspective view onto an intermediate region between two positioning bodies, which shows a second example embodiment of the connecting device in accordance with an embodiment of the invention.

In accordance with various embodiments of the invention a connecting device K is provided on the wing 10a, which is coupled to each of two adjacent leading edge lifting bodies 13a by means of a coupling device K1, K2 in each case. For purposes of illustration the two edge regions 13.1 and 13.2 lying opposite one another of respectively two adjacent leading edge lifting bodies 13a are indicated in FIG. 4. For the connecting device K a longitudinal direction L-K can be defined, which runs through the centres or force connection points of the coupling devices. Here the connecting device can in general be formed in the shape of a bar. The connecting device K is configured in accordance with various embodiments of the invention such that in the event of a fracture of one positioning device V1, V2 of a leading edge lifting body 13a external forces acting on this are transferred via the respective connecting device K to the respectively adjacent leading edge lifting body 13a that is coupled together via this device.

In accordance with one example embodiment of the invention the connecting device K is configured and coupled to respectively two adjacent leading edge lifting bodies 13a, such that a controlled freedom of relative movement exists between the connecting device K and each of the leading edge lifting bodies 13a, at least in their retracted state. In this manner the connecting device K in the intact state of the high-lift system, in other words with mounting and positioning devices intact, does not exert any forces onto the leading edge lifting bodies 13a. At each coupling together of a connecting device K to the leading edge lifting body 13a the play in the mountings can, in particular, be between 1 mm and 15 mm, and preferably between 2 and 7 mm.

Figure 2:
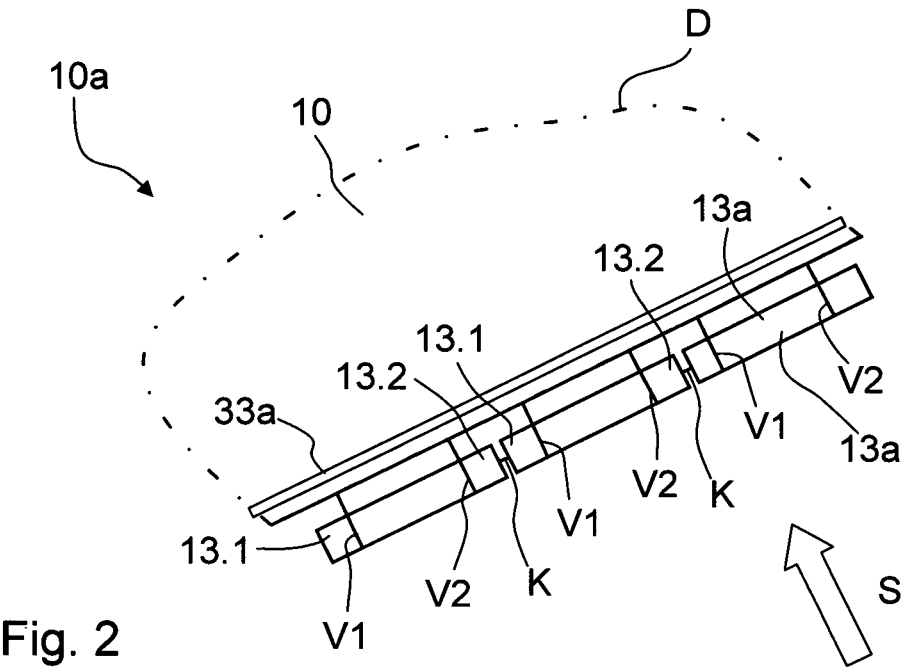
FIG. 2 shows a plan view onto a scrap section of the flow body in accordance with an embodiment of the invention, wherein the positioning bodies are represented in an extended position.

FIG. 2 represents a plan view onto a scrap section of the wing 10a in a state in which the related leading edge lifting bodies 13a, respectively adjustable via two positioning devices V1, V2 on the main wing 10, are located in an extended position, wherein each of the leading edge lifting bodies 13a is located in a normal state, in which, in particular, the respective leading edge lifting bodies 13a and also the force transfer capabilities of the positioning devices V1, V2 are undamaged. That the "positioning devices V1, V2 are undamaged" should in this connection signify in particular that the positioning devices V1, V2 are holding the respective leading edge lifting bodies 13a in stable positions with the air loads assumed in accordance with the design of the aircraft.

Figure 3:
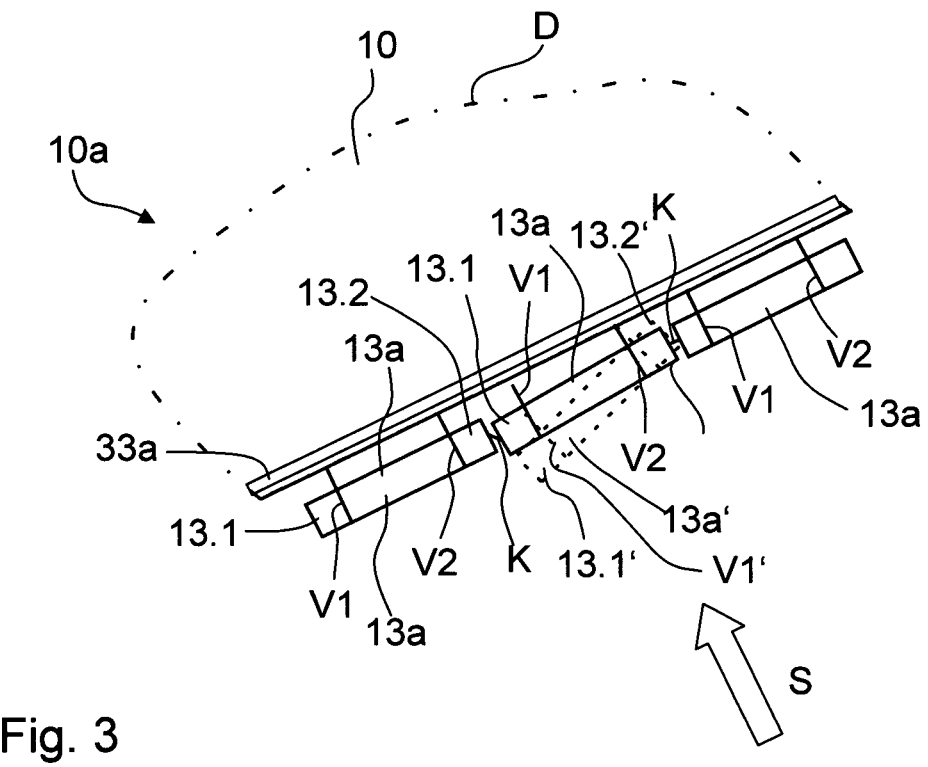
FIG. 3 shows a plan view onto a scrap section of the flow body in accordance with an embodiment of the invention, wherein damage has occurred to one of the positioning bodies.

FIG. 3 shows the scrap section represented in FIG. 2 of the wing 10a in a state in which one positioning device V1' of the positioning devices of one leading edge lifting body 13a' is damaged in this respect. The damage to the positioning device V1' can have occurred as a result of the action of external forces, or as a result of a fault in the positioning device V1' itself. The damage that is relevant with reference to various embodiments of the invention is thereby such that the positioning device V1' affected cannot accommodate the loadings occurring in operation of the aircraft in accordance with the design, or the loadings actually occurring. A damage event of this type can occur as a result of external forces, for example, as a result of bird impact. Here the damage event can, in particular, be the fracture of a force-transferring positioning part, such as a pushrod, or the fracture of a linkage of the positioning device V1'. The effect of these damage events is, in particular, that the edge region which, as seen in the spanwise direction of the high-lift body 13a', is situated on that side of the high-lift body 13a' on which the damaged positioning device V1' is situated, cannot be held in a stable position on the main wing 10 by the latter, and moves continuously relative to the main wing 10 under the influence of the external forces, or air loads. In the event of damage to a positioning device V1' the respectively affected leading edge lifting body 13a' is still held in a stable position as intended by the at least one other intact or undamaged positioning device—in FIGS. 3 and 4 the positioning device V2. In this state the respective leading edge lifting body 13a' in the end region (in FIG. 4 the end region with the reference symbol 13.2), which as seen in the spanwise direction lies on the same side as the damaged positioning device V1', is decoupled or loosened from the main wing 10, i.e. can no longer be held in a stable position on the latter.

Accordingly in FIG. 3 that leading edge lifting body 13a, which is no longer held in a stable position on the main wing 10 by a positioning device V1', on account of its damage, is represented with dashed lines and for purposes of illustration in a state in which it is situated at an angle to the same leading edge lifting body 13a with positioning devices V1, V2 intact. In FIG. 3 the leading edge lifting body with the damaged positioning device V1' is allocated the reference symbol 13a'. Schematically the angled location of the positioning body 13a' is designed to illustrate that the positioning body 13a' is not connected via connecting devices K with adjacent positioning bodies 13a, and as a result of the damage event at the end region 13.2' with the damaged positioning device V1' experiences a significantly more severe deflection than at the end region 13.1' with the intact positioning device V2.

In FIG. 4 the detailed region D represented in FIG. 2 with the connecting device K is represented in perspective in an enlarged manner. Each positioning body 13a has two end regions 13.1 and 13.2. Here the positioning bodies 13a are adjustably arranged one behind another in the spanwise direction S-T on the main wing 10 (not shown). Between the end regions 13.1 and 13.2 adjacent to one another of the leading edge lifting bodies 13a, situated side-by-side, is arranged the connecting device K, which extends in its lengthwise direction L-K, and via which the end regions 13.1, 13.2, situated side-by-side, of the adjacent leading edge lifting bodies 13a are connected with one another. In an exemplary and non-limiting manner the connecting device K is represented in FIG. 4 as a bar-shaped element of circular section. Alternatively the connecting device K can also be implemented in terms of a module with a plurality of sub-units. In general the connecting device K can have a square or rectangular outer shape.

Here the connecting device K functions as a mechanical coupling between two adjacent leading edge lifting bodies 13a. If a damage event similar to that represented in FIG. 3 occurs, that is to say, if one of the positioning devices V1 breaks, the connecting device K holds the loose side of the positioning body 13, so that the damaged leading edge lifting body 13a' approximately retains its position in accordance with specifications. This can even be accomplished in cases in which both, or in other words, all positioning devices of a positioning body 13 have been destroyed. In accordance with various embodiments of the invention connecting devices K can also connect a leading edge lifting body 13a with adjacent leading edge lifting bodies 13a on both sides. In this manner a chain of interconnected leading edge lifting bodies 13a can be formed extending along the spanwise direction S-T, of which in each case two can be coupled with one another in each case via one connecting device K in accordance with various embodiments of the invention. Accordingly, if any leading-edge lifting body 13a', which is located between two leading edge lifting bodies 13a, is damaged and a positioning device V1 or V2 is destroyed, the leading edge lifting body 13a' at the end region (in FIG. 4 the end region 13.2') at which one positioning device is damaged such that this can no longer hold the hinged end region in a stable position on the main wing, is held by the respectively adjacent leading-edge lifting body 13a within a predetermined region relative to the main wing. By this means the risk can be prevented in a particularly simple manner that in the event of damage a damaged leading-edge lifting body 13a' completely falls off or jams against adjacent leading-edge lifting bodies 13a.

In a particular form of embodiment of the present invention the connecting device K can be provided with different material properties, having a first elasticity value in the spanwise direction S-T, and a second elasticity value in the chordwise direction T-T. This elasticity value essentially takes the form of a strain value. By means of these different elastic properties the leading-edge lifting body 13a can achieve a high stiffness essentially in the incident flow direction F, i.e. therefore, in the chordwise direction T-T of the aircraft. By this means the device in accordance with various embodiments of the invention provides a high level of robustness with respect to bird strike or impacts that arise as a result of incident particles. The shock pulse, which for example occurs as a result of a bird impacting a leading-edge lifting body 13a is transferred on the one hand via the positioning devices V1, V2 of the leading-edge lifting body 13a to the main wing 10, and on the other hand is distributed via the connecting devices K to adjacent leading-edge lifting bodies 13a. Thus the force is led via a plurality of positioning devices V1, V2 onto the main body 10, so that each individual leading edge lifting body 13a is subjected to a lower absolute force.

In the devices known from the prior art the introduction of force into the main body only takes place via the holding devices of the positioning body 13. Thus the force that is to be cushioned is distributed onto a smaller number of components. The structure of various embodiments of the present invention thus offers the advantage that it is less often subjected to the risk of being impacted at the limit of its mechanical load capacity, since the force is distributed onto a larger number of positioning devices V1, V2 and thus the force in each component is reduced.

Then again the connecting device K can have a higher elasticity, i.e. can provide a higher measured strain, in the spanwise direction S-T of the wing 10a. This offers the advantage that in the spanwise direction S-T adjacent lifting leading-edge lifting bodies 13a can be connected elastically with one another. That is to say, if a damage event has occurred, forces that act on the loose leading-edge lifting body 13a, are transferred in a damped manner to adjacent components. Accordingly if, by virtue of the flow, strong lifting forces are acting on a leading-edge lifting body 13a' that is loose on one side, this impulse is transferred in a damped manner by the elastic connecting device to the adjacent leading-edge lifting bodies 13a. In the event of a damaged positioning body 13 external forces are transferred via a connecting device K, in particular if this is attached in a pre-loaded manner to adjacent leading-edge lifting bodies 13a, between these, and via their positioning devices are introduced into the main body 10.

Figure 5:
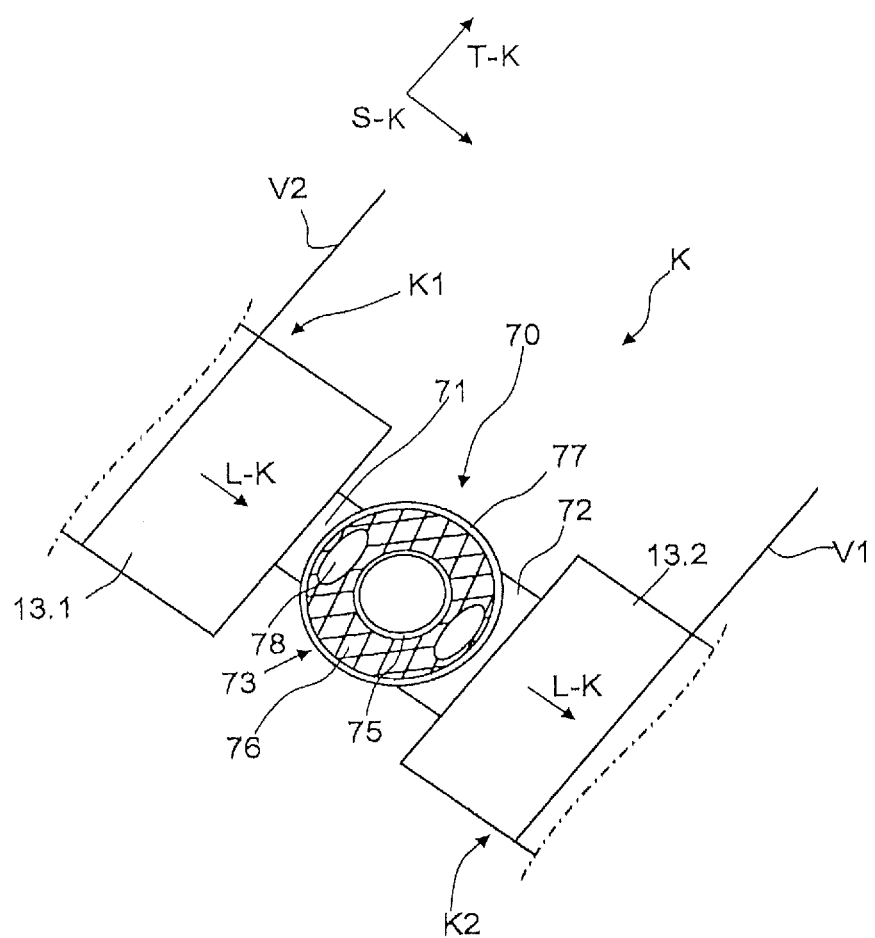
FIG. 5 shows a plan view onto an intermediate region between two adjacent positioning bodies, which shows a second example embodiment of the connecting device in accordance with an embodiment of the invention.

In a preferred form of embodiment of the invention, which is represented in FIG. 5. In an exemplary and non-limiting manner, the connecting device K is not designed in one piece, but is configured as a module. These forms of embodiment use a first connecting part 71, stiff or rigid in the longitudinal direction L-K, and a second connecting part 72, stiff or rigid in the longitudinal direction L-K, where the first connecting part 71 is attached to a first leading-edge lifting body 13a and the second connecting part 72 is attached to a second adjacent leading-edge lifting body 13a, situated near the first leading-edge lifting body 13a, in particular such that they cannot rotate. The connecting parts 71 and 72 are respectively connected with one another via an elastic bearing 73, which in particular can be configured as a rubber mounting. A mounting of this kind can be configured as a so-called bushing, which takes the form of a spatial configuration, which has differing elastic properties in different axes, e.g. in the three spatial axes. The bushing is formed from a first, internal reinforcement 75, which is surrounded by an elastic material 76, for example rubber, and an external reinforcement 77 which surrounds the elastic material 76, so that the elastic material is surrounded by the reinforcements 75, 77. The internal reinforcement 75 is part of an axis 70, or forms a receptacle for an axis 70, which is coupled or attached to the first connecting part 71. The reinforcements can have circular cross-sectional surfaces. By the provision of different types of rubber and/or of rubber with different material properties in the direction of the various spatial axes as a filling material between the reinforcements different stiffnesses/elasticities of the bearing can be achieved in the different spatial axes. Furthermore air-alveoli 78 can also be provided in a rubber mass 76 to influence the elastic values, which with reference to the longitudinal L-K are situated at various points between the reinforcements 75, 77. In this manner the elasticities of the mounting can also be defined in different directions. By this means a connecting device K can be created in a particularly simple manner, which has a high stiffness, or is rigid, in the chordwise direction T-T and in the spanwise direction S-T is elastic.

The mounting 73 described can also form a coupling device K1, K2 respectively.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wing of an aircraft comprising a main wing and an arrangement of leading edge lifting bodies, which as seen with reference to the flow direction are arranged on the leading edge, which are adjustably arranged on the main wing one behind another as seen in a spanwise direction of the main wing respectively by two positioning devices spaced apart from one another in the spanwise direction of the main wing,
wherein the wing has a connecting device, which is coupled to each of two adjacent leading edge lifting bodies, wherein the connecting device is configured such that in the event of a fracture of one positioning device of a leading edge lifting body, external forces acting on the latter are transferred in a chordwise direction substantially orthogonal to the spanwise direction via the respective connecting device to the leading edge lifting bodies coupled via the latter, wherein the connecting device comprises:
a first connecting part which is rigid in the spanwise direction and which is attached to a first leading-edge lifting body; and
a second connecting part which is rigid in the spanwise direction and which is attached to a second adjacent leading-edge lifting body situated near the first leading-edge lifting body;
wherein the connecting parts are respectively connected with one another via an elastic bearing.

2. The wing in accordance with claim 1, wherein the connecting device is configured and coupled to each of two adjacent leading edge lifting bodies, such that a controlled freedom of relative movement exists between the connecting device and each of the leading edge lifting bodies, at least in their retracted state, which is selected such that in normal operation the connecting device does not transfer any loads in a direction of a longitudinal axis of the connecting device.

3. The wing in accordance with claim 1, wherein the connecting device is integrated with one or more of a damping device or a crash absorber device to dampen shocks occurring in the connecting device.

4. The wing in accordance with claim 1, wherein the connecting device is configured in an elastic manner.

5. The wing in accordance with claim 1, wherein the connecting device is configured in an elastic manner and such that it couples the leading edge lifting bodies, at least in an extended position of the same, in a pre-loaded state.

6. The wing in accordance with claim 1, wherein the connecting device is mounted on the leading edge lifting bodies, which are coupled by the connecting device, such that the connecting device cannot rotate with respect to the leading edge lifting bodies.

7. The wing in accordance with claim 1, wherein the leading edge lifting body is a slat.

8. The wing in accordance with claim 1, wherein the leading edge lifting body is a Krüger flap.

9. The wing in accordance with claim 1, wherein the elastic bearing comprises a rubber mounting.

10. The wing in accordance with claim 9, wherein the rubber mounting comprises a bushing that is formed from a first internal reinforcement, which is surrounded by an elastic material and an external reinforcement that surrounds the elastic material, wherein the elastic material is surrounded by the reinforcements.

11. The wing in accordance with claim 10, wherein the elastic material is a rubber.

12. The wing in accordance with claim 11, wherein the elastic material comprises one or more rubber air-alveoli provided to influence the elastic values, the air-alveoli being situated between the first internal reinforcement and the external reinforcement.

13. The wing in accordance with claim 12, wherein the first connecting part is attached to the first leading-edge lifting body and the second connecting part is attached to the second adjacent leading-edge lifting body such that the first and second connecting parts cannot rotate with regard to the respective leading-edge lifting body.

14. The wing in accordance with claim 1, wherein the connecting device is designed to be more rigid in the chordwise direction than in the spanwise direction.

* * * * *